Patented June 3, 1947

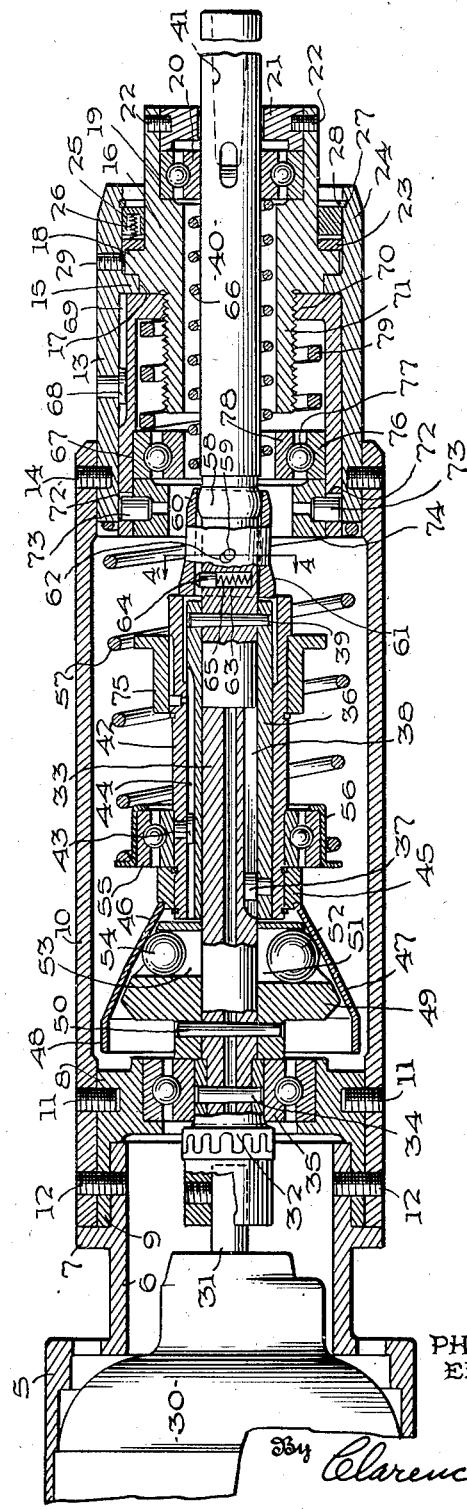

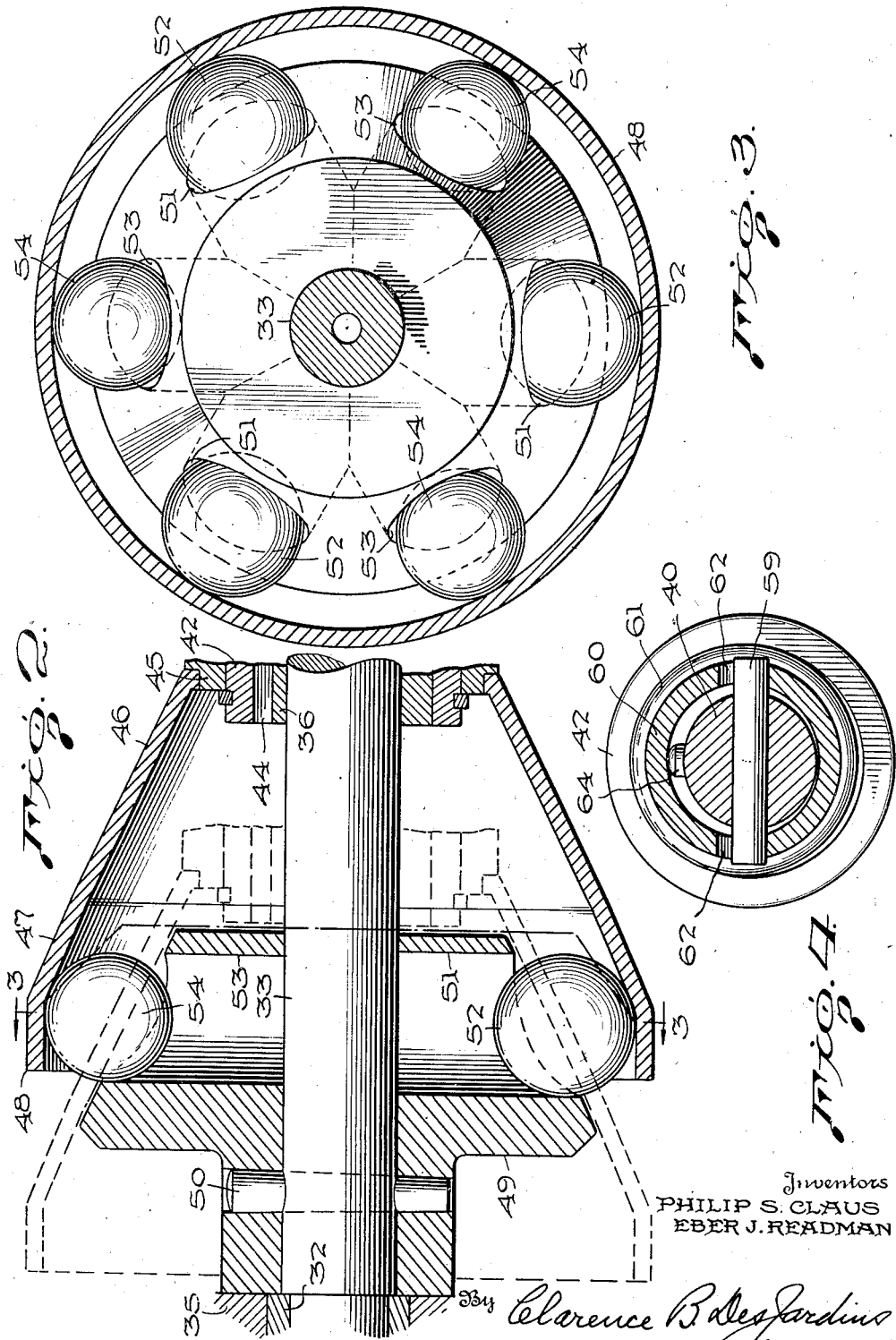

2,421,541

UNITED STATES PATENT OFFICE 2,421,541

AUTOMATIC DRILL HEAD

Philip S. Claus, Plymouth, and Eber J. Readman, Huntington Woods, Mich.; said Readman assignor to said Claus Application March 14, 1945, Serial No. 582,646

19 Claims. (Cl. 77—33)

Our invention relates to improvements in automatic drill heads and has to do, more particularly, with an improved automatic feeding mechanism for feeding a rotary cutter, such as a drill or a reamer.

The principal object of our invention is to provide an improved mechanism for automatically feeding a rotary cutter toward the work, and discontinuing said feed at a predetermined point in the advance of the tool.

A further object of our invention is to provide an automatic feeding mechanism for a rotary cutter, of such nature that the tool will be retracted slightly from the work, at the instant of discontinuance of the feed.

Another object of our invention is to provide an automatic feeding mechanism for rotary cutters having a means for discontinuing the feed at a predetermined point in the advance of the tool toward the work, and convenient means for adjusting the mechanism so as to change the point at which the feed will be discontinued.

A further object of our invention is to provide an automatic means for advancing a rotary cutter toward the work, of such nature that the initial feeding pressure will be increased shortly after the feed begins.

Further objects, and objects relating to details and economies of construction and operation, will definitely appear from the detailed description to follow. In one instance, we have accomplished the objects of our invention by the devices and means disclosed in the following specifications. Our invention is distinctly pointed out and defined in the appended claims. A structure, constituting a preferred embodiment of our invention, is shown in the accompanying drawings, forming a part of this specification, in which:

Fig. 1 is a longitudinal, sectional view through an automatic drill head embodying our invention.

Fig. 2 is an enlarged, sectional view, corresponding to a part of Fig. 1, showing the ball cage and balls with the pusher member in advanced position, this member being shown in normal position by dotted lines.

Fig. 3 is a sectional view, taken on the line 3—3 of Fig. 2.

Fig. 4 is a detail, sectional view, taken on the line 4—4 of Fig. 1.

In the drawings, the same reference numerals refer to the same parts throughout the several views, and the sectional views are taken looking in the direction of the arrows at the ends of the section lines.

In general, the automatic feeding mechanism of our invention comprises a motor-driven shaft to which a spindle is connected, so as to rotate therewith but to be movable longitudinally with respect thereto. The spindle and the shaft are coaxial and the spindle is formed to receive the shank of a rotary cutter such as a drill or reamer. To feed the tool-carrying spindle toward the work, we provide a feed sleeve coaxial with the shaft and movable longitudinally thereon, and means for advancing said sleeve automatically as the shaft rotates. Spring means are provided which yieldingly oppose the advance of this feed sleeve. To transmit the advance of the feed sleeve to the spindle, a member is pivotally mounted on the spindle and normally has a portion thereof disposed in the path of advance of the feed sleeve, so that the advance of said sleeve moves the spindle to feed it, and we provide means that are automatically effective, at a predetermined point in the advance of the spindle, for rocking the pivotally mounted member on the spindle to withdraw it from the path of advance of the feed sleeve and thus discontinue the spindle feed. This member pivotally mounted on the spindle may take the form of a collet, or sleeve, which is normally cocked on its mounting on the spindle, so that its axis extends at an angle to the axis of the shaft and spindle and a part of the collet is in the path of advance of the feed sleeve. The means for discontinuing the spindle feed may take the form of an annular member, mounted in the tool casing coaxial with the spindle and surrounding it, and so located that, as the advance of the spindle carries the collet within this annular member, it acts to center the collet with respect to the spindle, rocking it from the cocked position to one in which the axis of the collet coincides with that of the spindle. The connection between the collet and the spindle may be such that, when the collet is rocked to discontinue the feed, it automatically causes a slight retraction of the spindle with respect to the collet. The collet may be mounted on the spindle with the interior of the forward portion thereof bearing on a ball portion of the spindle, and with inclined slots in the wall of the collet engaging the opposite ends of a pin mounted in the spindle and extending transversely thereof. The inclination of these slots will be such that the rocking of the collet with respect to the spindle necessarily causes a slight retraction of the spindle with respect to the collet. The means for centering the collet to discontinue the feed may take the form of the inner race of a ball bearing, mounted within the casing so as to be adjustable longitudinally thereon to vary the point at which the feed will be discontinued. This bearing may be carried by a brake sleeve slidable longitudinally within the casing, and which also carries a brake ring, and the adjustment of this sleeve longitudinally of the casing is conveniently effected by a rotatable adjusting member.

Our invention comprises, also, improved means for automatically advancing the feed sleeve as the shaft rotates, which may include a ball cage having two sets of radial bores. The bores of one set are of larger diameter than those of the other and centrifugal balls are mounted in these radial bores, the balls of one set being larger and heavier than those of the other. When the driven shaft starts to rotate, the larger balls alone exert centrifugal force on the pusher member, tending to advance the feed sleeve, but the rotation of the shaft soon causes the smaller balls to engage the pusher member and add their centrifugal force, so that the pressure tending to advance the feed sleeve is increased soon after the shaft starts to rotate.

Referring to the numbered parts of the drawing, the automatic drill head of our invention is provided with a casing which includes a rear member 5 for mounting the motor, having a forwardly-extending cylindrical part 6, provided with a radial flange 7 extending outwardly therefrom. The bearing support 8 has a rearwardly-extending annular flange 9, which fits on the portion 6 and abuts against the forward face of the flange 7. The main portion of the casing consists of a cylindrical member 10, the rear portion of which seats on the exterior of bearing support 8 with its rear end abutting the flange 7, and secured to the bearing support 8, and the portion 6 of the motor housing 5, by screws 11 and 12. The forward portion of the casing is formed by a cylinder 13, which fits within the forward portion of the cylinder 10 and is secured thereto by the screws 14. The cylinder 13 is provided with an internal annular flange 15. A rotatable adjusting member 16, has an annular shoulder 17, and an annular flange 18, and the adjustable member fits within the forward end of cylinder 13 with the shoulder 17 engaging the inner face of flange 15, and the flange 18 engaging the front face of said flange 15. A seat 19 is formed in the forward portion of the adjusting member 16, and receives the ball bearing 20, in which the spindle is journaled. A retaining member 21 fits within the forward end of adjusting member 16, and is secured thereto by screws 22, and this retaining member engages the ball bearing 20 and holds it in its seat 19. A ring 23 is mounted within the casing member 13 and engages the forward face of the flange 18 on the adjusting member 16. Another ring 24 also seats within the forward end of the casing member 13 and is held in position therein by a split ring 28, engaging in a groove 27 in the casing member. The ring 24 has three symmetrically arranged sockets 25 therein, in each of which a spring 26 is seated, engaging the forward face of ring 23 and pushing it toward the flange 18.

An electric motor 30 is mounted in and carried by the casing member 5, and the armature shaft 31 of said motor is connected through a coupling 32 to the motor-driven shaft 33 by the transverse pin 34. The shaft 33 is journaled in the casing, at the point where it enters the hub of the coupling member 32, by the ball bearing 35, which is mounted in the bearing support 8. A sleeve 36 is mounted on the motor-driven shaft 33 and a stud 37, carried by said sleeve, engages in a longitudinal groove 38 in the shaft. The forward end of sleeve 36 is connected by the transverse pin 39 to the rear end of the spindle 40, which extends within said sleeve. It will be seen, therefore, that the spindle 40 is coaxial with the motor-driven shaft 33 and connected to the shaft so as to rotate therewith but be movable longitudinally thereof. The forward end of the spindle 40 is provided with a recess 41, adapted to receive the shank of a rotary cutter such as a drill or reamer, and is journaled in the ball bearing 20.

In order to advance the spindle carrying the tool automatically, as the shaft 33 rotates, we have provided a feed sleeve 42, coaxial with the shaft 33 and mounted upon the outside of sleeve 36. A stud 43, carried by the feed sleeve 42, engages in a longitudinal groove 44 formed in the outside of sleeve 36, so that said sleeve rotates with the driven shaft 33, but is movable longitudinally with respect thereto. A ring 45, secured to the rear end of the feed sleeve 42, has secured thereto a frusto-conical pusher member, including the forward portion 46, the intermediate portion 47 of less slope than the forward portion 46, and the rear cylindrical portion 48. The ball cage 49 is mounted on the motor-driven shaft 33, and secured thereto by the transverse pin 50. This ball cage has two sets of radial bores therein, each set comprising three bores symmetrically arranged about the axis of shaft 33, and the bores of the two sets being interspersed. The bores 51 are of larger diameter than the other bores 53. Large centrifugal balls 52 are mounted in the larger bores 51, so as to move therein radially with respect to the axis of shaft 33, and smaller centrifugal balls 54 are correspondingly mounted in the smaller bores 53. The ball cage, and the balls 52 and 54, are housed within the frusto-conical pusher member and normally, that is to say, when shaft 33 is at rest, the large balls 52 engage the steeper portion 46 on the pusher member. As the shaft 33 starts to rotate, the centrifugal force exerted by these large balls is transmitted through the pusher member to advance the feed sleeve 42. As the shaft continues to rotate, the smaller balls 54 are by centrifugal force brought into contact with the pusher member and add their force to advance the feed sleeve. Thus, the feeding pressure is increased soon after the shaft starts to rotate. As the feed sleeve is advanced, the balls come into contact with the portion 47 of less slope and, thus, the component of force effective to advance the sleeve is reduced and, when the balls finally engage the cylindrical portion 48 of the pusher member, centrifugal force will no longer be effective to advance the sleeve 42.

The inner race of a ball bearing 55 is mounted on the sleeve 42, in front of the ring 45, and a spring seat 56 is mounted on the outer race of the ball bearing. A coiled compression spring 57 is interposed between the spring seat 56 and the rear end of the cylindrical casing member 13. This spring yieldingly opposes the advance of the feed sleeve 42 as the shaft rotates, and, when the shaft is brought to rest, this spring returns the feed sleeve 42 and the pusher member to the normal position, shown in Fig. 1.

A partly spherical, or ball, portion 58 is formed on the spindle 40, toward the rear end thereof, and a transverse pin 59 extends through the spindle, a short distance in front of this ball portion. A collet sleeve 60 is mounted on the spindle, surrounding it, with the interior of the forward portion of the sleeve in engagement with the ball portion 58 of the spindle, and with the ends of the transverse pin 59 projecting into inclined slots 62 in the collet sleeve, diametrically opposite each other. On the rear portion of the collet sleeve 60, there is formed an external frusto-conical shoulder 61. A transverse socket 63 is formed in the spindle, in the rear of the pin 59, and this socket houses a plunger 64, which engages the inside of the rear portion of the collet sleeve and is pressed upwardly against the sleeve by the spring 65 housed in and seating on the bottom of the socket. This spring-pressed plunger 64 normally rocks or cocks the collet, about its pivotal mounting on the spindle, so that the axis of the collet sleeve 60 extends at an angle to the axis of the shaft 33 and spindle 40 and, under such conditions, the rear end of the collet sleeve projects into the path of the feed sleeve 42, so that, as the feed sleeve is automatically advanced upon rotation of the shaft, the cocked collet sleeve transmits this feeding motion to the spindle 40. When the collet sleeve is rocked, so as to bring its axis into alignment with the axis of shaft 33 and spindle 40, the collet sleeve 60 and spindle 40 will be retracted, to withdraw the tool from the work, the collet passing within the forward end of the feed sleeve 42. This is brought about by the coiled compression spring 66, interposed between the forward end of the collet sleeve 60 and the inner race of the ball bearing 20, which spring yieldingly opposes the advance of the spindle and pulls it away from the work, as soon as the collet sleeve 60 is tilted from its cocked position into concentricity with the feed sleeve 42. The inclination of the slots 62 is such that the rocking of the collet 60, from its cocked to its concentric position, causes a slight relative movement between the spindle 40 and the collet 60, so that, at the instant of discontinuance of the spindle feed, the spindle is retracted slightly by the rocking of the collet and, thereafter, the spindle is completely retracted by the pressure of spring 66.

A brake sleeve 67 is mounted within the cylindrical casing member 13 and held against rotation with respect thereto, while being permitted longitudinal movement, by means of a stud 68 carried by casing member 13 and engaging in the longitudinal groove 69, formed in the outer surface of the brake sleeve. The forward end of said brake sleeve has an inwardly extending annular flange 70, which is internally threaded and engages the externally threaded portion 71 of the rotatable adjusting member 16. By rotating the adjusting member 16, the brake sleeve 67 will be adjusted longitudinally of the casing 13, since it is held against rotation with respect to the casing. In this way, the position of the brake sleeve in the casing can be accurately determined. The rear portion of brake sleeve 67 is provided with a pair of elongated holes 72, which receive pins 73 carried by a brake ring 74. This ring is adapted to be engaged by a brake flange 75 fast to the feed sleeve 42, near the front end thereof. The friction developed between the brake ring 74 and the brake flange 75 brings the shaft 33, and the parts connected therewith, to rest more speedily, when the power is cut off from the motor 30 by a switch (not shown) arranged to be operated automatically, when the feeding movement of the tool is completed.

The outer race 76 of a ball bearing is mounted within the brake sleeve 67, in engagement with the front face of the brake ring 74. Balls 77 of the bearing are interposed between the outer race 76 and the inner race 78, which surrounds the spindle 40 and is coaxial with shaft 33 and spindle 40. A coiled compression spring 79 is interposed between the outer race 76 of this ball bearing and the rear face of the flange 70, and yieldingly moves the bearing race 76 and the brake ring 74, to the rearmost position permitted by the engagement of the pins 73 in the elongated holes 72. It will be observed that, by rotating the adjusting member 16, the forward end of which has an external knurled surface to facilitate such rotation by the operator, the brake sleeve 67 will be adjusted longitudinally of the casing member 13 and, thereby, the inner race 78 of the ball bearing, and the brake ring 74, will be positioned accurately, so as to cause the spindle feed to be discontinued at a predetermined point. As the spindle 40 is advanced, the forward portion of the collet 60 will enter the annular race 78 and, when the frusto-conical portion 61 of the collet engages the said race, the collet 60 will be rocked into concentric relation with the axis of shaft 33 and spindle 40, thereby discontinuing the spindle feed.

Fig. 1 illustrates the positions occupied by the parts of this tool-feeding mechanism, when power is cut off from the motor 30 and the driven shaft 33 is at rest. It will be observed that collet 60 is cocked, so as to project a portion of the rear end thereof in the path of advance of the feed sleeve 42. When the switch is closed, to supply current to the motor 30, shaft 33 is driven, thus driving, also, the sleeve 36, the spindle 40, the feed sleeve 42, and the ball cage 49. As the shaft 33 rotates, the large balls 52 first exert centrifugal force on the part 46 of the pusher member to advance the feed sleeve 42, and continued rotation of the shaft causes this centrifugal force to be supplemented by the centrifugal force of the smaller balls 54, which now engage the pusher member. Thus, the feed sleeve 42 is advanced automatically, as the shaft rotates, against the yielding pressure of spring 57. The advance of the feed sleeve 42, through collet 60, causes the spindle 40 to advance also, to move the rotary cutter toward the work. When the spindle 40 has advanced so far that the frusto-conical portion 61 of the collet 60 engages the inner race 78 of the ball bearing carried by the brake sleeve 67, the collet 60 will be rocked, on its pivotal mounting on the spindle 40, so as to bring the rear end thereof into concentric relation with the axis of shaft 33, and this rocking motion will retract the spindle 40 slightly, relative to the collet 60. As soon as the collet becomes concentric with the axis of shaft 33, compressed spring 66 becomes effective to withdraw the spindle and move the collet 60 rearwardly into the forward end of the feed sleeve 42. The advance of the feed sleeve 42 will have brought the brake flange 75 into engagement with the brake ring 74, which yields slightly because of the spring 79, and, when the circuit to the motor is automatically opened at this point, the shaft 33 will quickly come to rest because of the friction developed between the brake flange 75 and the brake ring 74. When the shaft 33 comes to rest, the feeding pressure is withdrawn from the feed sleeve 42, and it is returned to normal position by the spring 57. As it returns to normal position, the forward end of feed sleeve 42 moves in the rear of the rear end of the collet 60, whereupon spring 65 becomes effective, through the plunger 64, to cock the collet into the position shown in Fig. 1, and the automatic feeding mechanism is in position for a subsequent cycle of operations.

We are aware that the automatic feeding mechanism for rotary cutters described herein is susceptible of considerable variation without departing from the spirit of our invention and, therefore, we claim our invention broadly, as indicated by the appended claims.

Having thus described our invention, what we claim as new and useful and desire to secure by Letters Patent is:

1. In a device of the class described including a motor-driven shaft, a spindle connected to said shaft to rotate therewith but movable longitudinally with respect thereto, said spindle being adapted to receive the shank of a rotary cutter, a feed sleeve movable longitudinally of said shaft, and means for advancing said sleeve automatically as the shaft rotates, the combination of a member pivotally mounted on said spindle and normally having a portion thereof disposed in the path of said advancing sleeve, whereby the advance of said sleeve advances said spindle to feed it, and means, automatically effective at a predetermined point in the advance of said spindle, for rocking said pivotally mounted member on the spindle to withdraw the member from the path of the advancing sleeve and thus discontinue the spindle feed.

2. In a device of the class described including a motor-driven shaft, a spindle connected to said shaft to rotate therewith but movable longitudinally with respect thereto, said spindle being adapted to receive the shank of a rotary cutter, a feed sleeve movable longitudinally of said shaft, means for advancing said sleeve automatically as the shaft rotates, and spring means yieldingly opposing the advance of said sleeve, the combination of a member pivotally mounted on said spindle and normally having a portion thereof disposed in the path of said advancing sleeve, whereby the advance of said sleeve advances said spindle to feed it, spring means yieldingly opposing the advance of said spindle, and means, automatically effective at a predetermined point in the advance of said spindle, for rocking said member on the spindle to withdraw the member from the path of the advancing sleeve to discontinue the feed.

3. In a device of the class described including a motor-driven shaft, a spindle connected to said shaft to rotate therewith but movable longitudinally with respect thereto, said spindle being adapted to receive the shank of a rotary cutter, a feed sleeve movable longitudinally of said shaft, means for advancing said feed sleeve automatically as the shaft rotates, and spring means yieldingly opposing the advance of said feed sleeve, the combination of a collet pivotally mounted on and surrounding said spindle and having its rear end normally eccentric with respect to the spindle and disposed in the path of the advancing feed sleeve, whereby the advance of said sleeve advances said spindle to feed it, spring means yieldingly opposing the advance of said spindle, and means, automatically effective at a predetermined point in the advance of said spindle, for rocking said collet on the spindle to bring the rear end thereof into concentricity with the spindle and out of the path of the feed sleeve to discontinue the feed.

4. In a device of the class described including a motor-driven shaft, a spindle connected to said shaft to rotate therewith but movable longitudinally with respect thereto, said spindle being adapted to receive the shank of a rotary cutter, a feed sleeve movable longitudinally of said shaft, means for advancing said feed sleeve automatically as the shaft rotates, and spring means yieldingly opposing the advance of said sleeve, the combination of a collet pivotally mounted on and surrounding said spindle, a spring acting on said collet to rock the rear end thereof into eccentricity with respect to the spindle and into the path of advance of said feed sleeve, spring means yieldingly opposing the advance of said spindle, and means, automatically effective at a predetermined point in the advance of said spindle, for rocking said collet against the pressure of said spring to bring the collet into concentricity with the spindle and thereby to withdraw the rear end of the collet from the path of the feed sleeve to discontinue the feed.

5. In a device of the class described including a motor-driven shaft, a spindle coaxial with said shaft and connected thereto for rotation therewith but movable longitudinally with respect thereto, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said sleeve, the combination of a member pivotally mounted on said spindle and normally having a portion thereof disposed in the path of advance of said sleeve, and means, automatically effective at a predetermined point in the advance of said spindle, for rocking said member on the spindle into coaxial relation with the shaft to withdraw the member from the path of advance of said sleeve and discontinue the spindle feed.

6. In a device of the class described including a motor-driven shaft, a spindle coaxial therewith and connected thereto to rotate therewith but movable longitudinally with respect thereto, said spindle being adapted to receive the shank of a rotary cutter, a feed sleeve coaxial with said shaft and movable longitudinally thereof, means for advancing said feed sleeve automatically as the shaft rotates, and spring means yieldingly opposing the advance of said feed sleeve, the combination of a collet pivotally mounted on and surrounding said spindle with its axis normally extending at an angle to that of said shaft, whereby the rear end of said collet is disposed in the path of advance of said feed sleeve to transmit feeding motion therefrom to the spindle, spring means yieldingly opposing the advance of said spindle, and means, automatically effective at a predetermined point in the advance of said spindle, for rocking said collet to bring its axis into line with that of the shaft and discontinue the spindle feed.

7. In a device of the class described including a motor-driven shaft, a spindle coaxial therewith and connected thereto to rotate therewith but movable longitudinally with respect thereto, said spindle being adapted to receive the shank of a rotary cutter, a feed sleeve coaxial with said shaft and movable longitudinally thereof, means for advancing said feed sleeve automatically as the shaft rotates, and spring means yieldingly opposing the advance of said sleeve, the combination of a collet pivotally mounted on and surrounding said spindle, a spring acting on said collet to rock the same to a position in which its axis extends at an angle to that of the shaft and the collet lies in the path of advance of said sleeve to transmit feeding motion therefrom to said spindle, spring means yieldingly opposing the advance of said spindle, and means, automatically effective at a predetermined point in the advance of the spindle, for rocking said collet against the pressure of said spring into coaxial relation with the shaft to discontinue the spindle feed.

8. In a device of the class described including a motor-driven shaft, a spindle coaxial therewith and connected thereto to rotate therewith but movable longitudinally thereof, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said sleeve, the combination of a member pivotally mounted on said spindle and normally having a portion thereof disposed in the path of advance of said sleeve to transmit feeding motion therefrom to said spindle, spring means yieldingly opposing the advance of said spindle, means, automatically effective at a predetermined point in the advance of the spindle, for rocking said member on the spindle to withdraw the member from the path of advance of the spindle to discontinue the spindle feed, and means for retracting the spindle with respect to said member when the member is so rocked.

9. In a device of the class described including a motor-driven shaft, a spindle coaxial therewith and connected thereto to rotate therewith but movable longitudinally with respect thereto, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said feed sleeve, the combination of a collet pivotally mounted on and surrounding said spindle and having its rear end normally eccentric with respect to the spindle and disposed in the path of advance of said sleeve to transmit feeding motion therefrom to said spindle, spring means yieldingly opposing the advance of said spindle, means, automatically effective at a predetermined point in the advance of the spindle, for rocking said collet to bring the rear end thereof into concentricity with said spindle and out of said path to discontinue the feed, and means for retracting the spindle with respect to the collet when the collet is so rocked.

10. In a device of the class described including a motor-driven shaft, a spindle coaxial therewith and connected thereto to rotate therewith but movable longitudinally thereof, said spindle being adapted to receive the shank of a rotary cutter, a feed sleeve coaxial with the shaft and movable longitudinally thereof, means for advancing said sleeve automatically as the shaft rotates, and spring means yieldingly opposing the advance of said sleeve, the combination of a transverse pin carried by the spindle, a ball portion on the spindle in front of said pin, a collet surrounding said spindle with its forward end fulcrumed on said ball portion and having an inclined slot receiving said pin, whereby rocking of the collet in one direction with respect to the spindle retracts the latter with reference to the collet, a spring acting on the rear portion of the collet to rock it to a position in which its axis extends at an angle to the axis of the shaft and the collet projects into the path of advance of the feed sleeve to transmit feeding motion therefrom to said spindle, spring means yieldingly opposing the advance of said spindle, and means, automatically effective at a predetermined point in the advance of the spindle, for rocking said collet against the pressure of said spring to bring the axes of collet and shaft into alignment to retract the spindle with reference to the collet and discontinue the feed.

11. In a device of the class described including a motor-driven shaft, a spindle coaxial therewith and connected thereto to rotate therewith but movable longitudinally thereof, said spindle being adapted to receive the shank of a rotary cutter, a feed sleeve coaxial with the shaft and movable longitudinally thereof, means for advancing said sleeve automatically as the shaft rotates, and spring means yieldingly opposing the advance of said sleeve, the combination of a transverse pin fixed in said spindle, a ball portion on the spindle in front of the pin, a collet sleeve surrounding said spindle with the front end engaging said ball portion and having a pair of diametrically opposite inclined slots receiving the ends of said pin, said spindle having a transverse socket therein, a spring-pressed plunger in said socket engaging the interior of the collet sleeve and tending to cock it on the spindle to present a portion of the collet sleeve in the path of advance of the feed sleeve to transmit feeding motion therefrom to said spindle, spring means yieldingly opposing the advance of said spindle, and means, automatically effective at a predetermined point in the advance of the spindle, for rocking said collet sleeve against the pressure of said spring to bring the axes of collet sleeve and shaft into alignment and to retract said spindle with respect to the collet sleeve.

12. In a device of the class described including a casing, a motor-driven shaft journaled therein, a spindle coaxial with the shaft and connected thereto to rotate therewith but movable longitudinally thereof, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said sleeve, the combination of a collet pivotally mounted on and surrounding said spindle with its axis normally extending at an angle to that of said shaft, whereby the rear end of the collet is disposed in the path of advance of said feed sleeve to transmit feeding motion therefrom to said spindle, spring means yieldingly opposing advance of the spindle, and an annular member carried by the casing in coaxial relation with said shaft and so located that advance of said feed sleeve moves said collet into engagement with said annular member to bring the collet into coaxial relation with said shaft to discontinue the spindle feed.

13. In a device of the class described including a casing, a motor-driven shaft journaled therein, a spindle coaxial with the shaft and connected thereto to rotate therewith but movable longitudinally thereof, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said sleeve, the combination of a collet pivotally mounted on and surrounding said spindle with its axis normally extending at an angle to that of said shaft, whereby the rear end of the collet is disposed in the path of advance of said feed sleeve to transmit feeding motion therefrom to said spindle, said collet having a frusto-conical portion, spring means yieldingly opposing the advance of the spindle, and an annular member coaxial with said shaft and carried by the casing in such location that the advance of the feed sleeve moves the frusto-conical portion of the collet into engagement with said annular member to rock the collet into axial alignment with the shaft and spindle to discontinue the spindle feed.

14. In a device of the class described including a casing, a motor-driven shaft journaled therein, a spindle coaxial with said shaft and connected thereto to rotate therewith but movable longitudinally thereof, said spindle being adapted to receive the shank of a rotary cutter, a feed sleeve coaxial with said shaft and movable longitudinally thereof, means for advancing the sleeve automatically as the shaft rotates, and spring means yieldingly opposing the advance of said sleeve, the combination of a collet pivotally mounted on and surrounding said spindle with its axis normally extending at an angle to that of the shaft, whereby the rear end of the collet is disposed in the path of advance of the sleeve to transmit feeding motion therefrom to said spindle, spring means yieldingly opposing the advance of the spindle, and an annular member coaxial with the shaft and mounted in the casing so as to be adjustable longitudinally thereof, said annular member being so located that the advance of said feed sleeve moves the collet into engagement with the annular member to rock the collet into axial alignment with the shaft and spindle to discontinue the spindle feed.

15. In a device of the class described including a casing, a motor-driven shaft journaled therein, a spindle coaxial with said shaft and connected thereto to rotate therewith but movable longitudinally thereof, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of the sleeve, the combination of a collet pivotally mounted on and surrounding the spindle with its axis normally extending at an angle to that of the shaft, whereby the rear end of the collet is disposed in the path of advance of the sleeve to transmit feeding motion therefrom to the spindle, spring means yieldingly opposing the advance of the spindle, an annular member so located that the advance of the sleeve moves the collet into engagement with the annular member to rock the collet into axial alignment with the shaft and spindle to discontinue the spindle feed, and anti-friction means for mounting the annular member in the casing coaxial with the shaft.

16. In a device of the class described including a casing, a motor-driven shaft journaled therein, a spindle coaxial with said shaft and connected thereto to rotate therewith but movable longitudinally thereof, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said sleeve, the combination of a collet pivotally mounted on and surrounding the spindle with its axis normally extending at an angle to that of the spindle, whereby the rear end of the collet is disposed in the path of advance of said feed sleeve to transmit feeding motion therefrom to the spindle, spring means yieldingly opposing the advance of the spindle, a brake sleeve mounted in the casing and adjustable longitudinally thereof, rotatable means for adjusting the brake sleeve, and an anti-friction bearing carried by the brake sleeve and including an inner raceway coaxial with and surrounding the spindle and positioned to be engaged by the collet as the spindle is advanced, whereby the collet is brought into axial alignment with the spindle to discontinue the spindle feed.

17. In a device of the class described including a casing, a motor-driven shaft journaled therein, a spindle coaxial with said shaft and connected thereto to rotate therewith but movable longitudinally thereof, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said sleeve, the combination of a collet pivotally mounted on and surrounding the spindle with its axis normally extending at an angle to that of the spindle, whereby the rear end of the collet is disposed in the path of advance of said feed sleeve to transmit feeding motion therefrom to said spindle, a spring means yieldingly opposing the advance of the spindle, a brake flange mounted on the feed sleeve, a brake sleeve mounted in the casing and adjustable longitudinally thereof, a brake ring carried by the brake sleeve and adapted to be engaged by the brake flange at the limit of advance of the feed sleeve, and an anti-friction bearing carried by the brake sleeve and having an inner, annular race member surrounding and coaxial with the spindle and adapted to be engaged by the collet to bring its axis into coaxial relation with the spindle to discontinue the spindle feed.

18. In a device of the class described including a casing, a motor-driven shaft journaled therein, a spindle coaxial with said shaft and connected thereto to rotate therewith but movable longitudinally thereof, said spindle being adapted to receive the shank of a rotary cutter, a feed sleeve coaxial with said shaft and movable longitudinally thereof, means for advancing said sleeve automatically as the shaft rotates, and spring means yieldingly opposing the advance of said sleeve, the combination of a collet pivotally mounted on and surrounding said spindle with its axis normally extending at an angle to that of the spindle, whereby the rear end of the collet is disposed in the path of advance of said feed sleeve to transmit feeding motion therefrom to the spindle, spring means yieldingly opposing the advance of the spindle, a brake flange mounted on the feed sleeve, a brake sleeve mounted in the casing and adjustable longitudinally thereof, said sleeve having a plurality of elongated holes therein, a brake ring mounted within said brake sleeve and adapted to be engaged by the brake flange at the limit of advance of the feed sleeve, a plurality of pins fixed to the brake ring and projecting into said elongated holes, an anti-friction bearing including an outer race member mounted within the brake sleeve and engaging the front face of the brake ring and an inner race member surrounding and coaxial with the spindle and adapted to be engaged by the collet to discontinue the spindle feed, and a spring engaging said outer race member and tending to move it and the brake ring rearwardly in the casing.

19. In a device of the class described including a motor-driven shaft, a spindle coaxial with said shaft and connected thereto to rotate therewith but movable longitudinally thereof, said spindle being adapted to receive the shank of a rotary cutter, a feed sleeve coaxial with said shaft and movable longitudinally thereof, spring means yieldingly opposing the advance of said sleeve, and means, automatically releasable at a predetermined point in the advance of the spindle, for transmitting feeding motion from the feed sleeve to the spindle, the combination of a ball cage rotatable with said shaft and having two sets of bores, the axes of which extend radially of and at right angles to the axis of the shaft, the bores of the two sets being interspersed and symmetrically arranged about the axis of the shaft and the bores of one set being of larger diameter than the bores of the other set, two sets of balls in said bores of diameters corresponding to the bores, and a frusto-conical pusher member secured to the feed sleeve and surrounding the ball cage and balls, whereby the centrifugal force of said balls acting on the pusher member advances the feed sleeve.

PHILIP S. CLAUS.
EBER J. READMAN.

REFERENCES CITED

The following references are of record in the file of this patent:

UNITED STATES PATENTS

| Number | Name | Date |
| --- | --- | --- |
| 2,280,115 | Broders et al. | Apr. 21, 1942 |
| 2,340,735 | Claus | Feb. 1, 1944 |